United States Patent
Zhu (10) Patent No.: US 9,112,967 B2
(45) Date of Patent: Aug. 18, 2015

(54) ANONYMOUS COMMUNICATION SYSTEM AND TRANSMISSION METHOD OF INFORMATION TRANSMISSION UNIT IN ANONYMOUS COMMUNICATION SYSTEM

(75) Inventor: Meng Zhu, Shenzhen (CN)

(73) Assignee: TENCENT TECHNOLOGY (SHENZHEN) COMPANY LIMITED (CN)

( * ) Notice: Subject to any disclaimer, the term of this patent is extended or adjusted under 35 U.S.C. 154(b) by 0 days.

(21) Appl. No.: 14/352,020

(22) PCT Filed: Jul. 2, 2012

(86) PCT No.: PCT/CN2012/078033
§ 371 (c)(1),
(2), (4) Date: Apr. 15, 2014

(87) PCT Pub. No.: WO2013/071763
PCT Pub. Date: May 23, 2013

(65) Prior Publication Data
US 2014/0241214 A1 Aug. 28, 2014

(30) Foreign Application Priority Data
Nov. 17, 2011 (CN) .......................... 2011 1 3649208

(51) Int. Cl.
| | |
|---|---|
| H04L 12/16 | (2006.01) |
| H04Q 11/00 | (2006.01) |
| H04M 3/42 | (2006.01) |
| H04W 4/02 | (2009.01) |
| H04L 9/00 | (2006.01) |
| G06F 15/16 | (2006.01) |
| G06F 17/00 | (2006.01) |

(52) U.S. Cl.
CPC .......... *H04M 3/42008* (2013.01); *H04W 4/028* (2013.01); *G06F 15/16* (2013.01); *G06F 17/60* (2013.01); *H04L 9/00* (2013.01)

(58) Field of Classification Search
None
See application file for complete search history.

(56) References Cited

U.S. PATENT DOCUMENTS

2001/0049620 A1* 12/2001 Blasko .......................... 705/10
(Continued)

FOREIGN PATENT DOCUMENTS

| CN | 101019118 A | 8/2007 |
|---|---|---|
| CN | 101114980 A | 1/2008 |
| CN | 101599993 A | 12/2009 |
| CN | 101605107 A | 12/2009 |

(Continued)

OTHER PUBLICATIONS

International Search Report issued Oct. 18, 2012: Re: PCT/CN2012/078033; citing: CN 101605107 A, CN 101019118 A, CN 102487363 A and CN 101599993 A.

*Primary Examiner* — Kodzovi Acolatse
(74) *Attorney, Agent, or Firm* — Cantor Colburn LLP (57) ABSTRACT

Disclosed are an anonymous communication system and a transmission method of an information transmission unit in the anonymous system. The method includes: after receiving an information transmission unit sent by a sending party, storing the information transmission unit in a storage pool, inserting the information transmission unit into a preset ordering queue, and generating more than one piece of index information according to content of the information transmission unit and information of the sending party; setting more than one index matching information of a receiving party; according to the index matching information of the receiving party, inquiring index information of the storage pool, finding out an information transmission unit set which meets the index matching information, selecting one information transmission unit from the set according to an ordering situation of each information transmission unit in the set in the ordering queue and a preset delivery strategy, delivering the information transmission unit to the receiving party, and adjusting the ordering queue according to a delivery situation. By means of the present disclosure, the degree of association between the receiving party and the content of the information transmission unit as well as the sending party can be improved, and the user response rate and activity can be improved.

15 Claims, 2 Drawing Sheets

(56) References Cited

U.S. PATENT DOCUMENTS

| | | | |
|---|---|---|---|
| 2004/0176995 A1* | 9/2004 | Fusz | 705/10 |
| 2008/0005264 A1* | 1/2008 | Brunell et al. | 709/217 |
| 2009/0234708 A1* | 9/2009 | Heiser et al. | 705/10 |

FOREIGN PATENT DOCUMENTS

| | | |
|---|---|---|
| CN | 101902410 A | 12/2010 |
| CN | 102487363 A | 6/2012 |
| TW | 200910845 A | 3/2009 |

\* cited by examiner

ANONYMOUS COMMUNICATION SYSTEM AND TRANSMISSION METHOD OF INFORMATION TRANSMISSION UNIT IN ANONYMOUS COMMUNICATION SYSTEM

FIELD OF THE DISCLOSURE

The present disclose relates to network communication technology, and more particularly to an anonymous communication system and transmission method of information transmission unit in anonymous communication system.

BACKGROUND

At present, with the development of network communication technology, network communication systems of a variety of segmentation fields have also appeared and developed, and satisfy special communication needs of users in different segmentation fields.

An anonymous communication system is one network communication system in the segmentation field. In the anonymous communication system, information sending party can send information transmission units of different types and content. The information transmission units do not specify a receiving party, and is directly sent to a background service system of the anonymous communication system. The background service system randomly selects one user from registered users as a receiving party, and sends the information transmission unit to the receiving party. In the anonymous communication system, users can input their blessing, wish, personal introduction, privacy inconvenient to tell familiar people and other contents into the information transmission unit for transmission; after the receiving party randomly matched by the anonymous communication system receives the information transmission unit, the receiving party can choose to respond to the information transmission unit and can also discard the information transmission unit. In the anonymous communication system, communicating parties are anonymous, thus, they do not have to worry about privacy issues and can speak freely. This meets such particular needs of some users. Since the sending party does not specify the receiving party, thus, the information transmission unit of the anonymous communication system is vividly called "floating bottle".

In the present anonymous communication system, the background service system usually randomly selects one user from registered users as a receiving party of the information transmission unit, or is further to use single user attribute based on sex and age, etc. of the sending party and the receiving party to match the receiving party of the information transmission unit. The receiving party matched in this way has low degree of association with the content of the information transmission unit as well as the sending party, this results in a low response rate of the receiving party for the received information transmission unit, and further results in a lower user activity in the whole anonymous communication system. The response rate refers to a proportion of information transmission units which users reply to information transmission units which users receive; the activity refers to frequency of users using information transmission units for communication.

SUMMARY

In view of this, a main object of the present disclosure is to provide an anonymous communication system and transmission method of information transmission unit in the anonymous communication system, which can improve the degree of association between a receiving party and content of the information transmission unit as well as a sending party.

The technical solutions of the present disclosure are implemented as follows:

An anonymous communication system includes:

a sending process unit configured to, after receiving an information transmission unit sent by a sending party, store the information transmission unit in a storage pool, insert the information transmission unit into a preset ordering queue, and generate more than one piece of index information according to content of the information transmission unit and information of the sending party;

a receiving process unit configured to set more than one index matching information of a receiving party; inquire index information of the storage pool according to the index matching information of the receiving party, find out an information transmission unit set which meets the index matching information, select one information transmission unit from the set according to an ordering situation of each information transmission unit in the set in the ordering queue and a preset delivery strategy, deliver the selected information transmission unit to the receiving party, and then adjust the ordering queue according to a delivery situation.

A transmission method of information transmission unit in anonymous communication system, the method includes:

after receiving an information transmission unit sent by a sending party, storing the information transmission unit in a storage pool, inserting the information transmission unit into a preset ordering queue, and generating more than one piece of index information according to content of the information transmission unit and information of the sending party;

setting more than one index matching information of a receiving party; inquiring index information of the storage pool according to the index matching information of the receiving party, finding out an information transmission unit set which meets the index matching information, selecting one information transmission unit from the set according to an ordering situation of each information transmission unit in the set in the ordering queue and a preset delivery strategy, delivering the selected information transmission unit to the receiving party, and then adjusting the ordering queue according to a delivery situation.

Compared with the related art, in the present disclosure, by using multiple index matching and multiple delivery strategies to find out information transmission unit which meets requirements of the user and other matching conditions randomly generated by the system, the degree of association between the receiving party and the content of the information transmission unit as well as the sending party in the anonymous communication system can be greatly improved, and the user response rate and activity can be improved, some complex matching requirements of the user can be met, and the user response rate and activity can be improved.

BRIEF DESCRIPTION OF DRAWINGS

To illustrate the technical solutions of examples of the present disclosure more clearly, accompanying drawings for describing the examples are introduced briefly in the following. Apparently, the accompanying drawings in the following description are only some examples of the present disclosure, and persons skilled in the art may derive other drawings from the accompanying drawings without creative efforts.

DETAILED DESCRIPTION

The present disclosure is further described in details hereinafter with reference to the accompanying drawings and examples.

Figure 1:
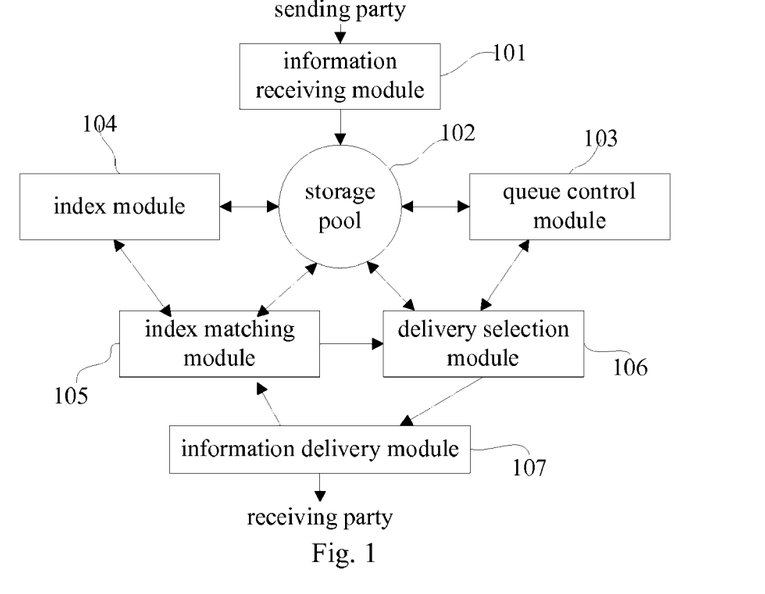
FIG. 1 is a schematic diagram of an anonymous communication system according to one example of the present disclosure.

FIG. 1 is a schematic diagram of an anonymous communication system according to one example of the present disclosure. Referring to FIG. 1, the anonymous communication system includes a sending process unit and a receiving process unit. The sending process unit includes an information receiving module 101, a storage pool 102, a queue control module 103 and an index module 104. The receiving process unit includes an index matching module 105, a delivery selection module 106 and an information delivery module 107.

The information receiving module 101 is configured to receive an information transmission unit sent by a sending party and store the information transmission unit in the storage pool 102. The information transmission unit is an information carrier containing data such as content and type of anonymous information, etc. in the anonymous communication system. For example, in a current anonymous communication system, the information transmission unit is vividly called "floating bottle", users can input their blessing, wish, personal introduction, privacy inconvenient to tell familiar people and other contents into the information transmission unit for transmission; after a receiving party randomly matched by the anonymous communication system receives the information transmission unit, the receiving party can choose to respond to the information transmission unit, and can also discard the information transmission unit.

The storage pool 102 is configured to store the information transmission unit.

The queue control module 103 is configured to set an ordering queue, insert the information transmission unit into the ordering queue, and adjust the ordering queue according to a delivery situation.

The index module 104 is configured to generate more than one piece of index information (i.e., multiple index information) according to content of the information transmission unit in the storage pool and information of the sending party.

The index matching module 105 is configured to set more than one index matching information of a receiving party, inquire index information of the storage pool 102 according to the index matching information of the receiving party, and find out an information transmission unit set which meets the index matching information. The index matching information can be set according to a receiving party user's attribute and/or historical record of the receiving party user for sending and receiving information transmission units. For example, in one specific example, the index matching information can be set as: city=Guangzhou and sex=female and age=mood for love (which is an age level range) and content=truth bottle (which is one type of the information transmission unit), etc.

A delivery strategy is pre-set in the delivery selection module 106. The delivery selection module 106 is configured to, according to an ordering situation of each information transmission unit in the set selected by the index matching module 105 in the ordering queue and the preset delivery strategy, select one information transmission unit from the set. The specific delivery strategy can be a variety of delivery strategies, for example, may include following manners:

according to an ordering situation of a delivery number queue, selecting one information transmission unit with the minimum delivery number from the set and delivering the selected information transmission unit to the receiving party;

on condition that more than one information transmission units have a same delivery number, according to an ordering situation of a recent delivery time queue, selecting one information transmission unit whose recent delivery time is the earliest from the information transmission units having the same delivery number and delivering the selected information transmission unit to the receiving party;

on condition that more than one information transmission units have a delivery number of 0, according to an ordering situation of a generation time queue, selecting one information transmission unit whose generation time is the earliest from the information transmission units having a delivery number of 0 and delivering the selected information transmission unit to the receiving party.

Of course, the delivery strategy is not limited to the above items, and can also be set and processed according to an administrator's needs.

The information delivery module 107 is configured to send information of the receiving party to the index matching module 105 and deliver the ultimately selected information transmission unit obtained from the delivery selection module 106 to the receiving party.

When the index matching module 105 sets more than one index matching information of the receiving party, the more than one index matching information of the receiving party can be set when the receiving party is offline, thus, the system of the present disclosure can allow information delivery for offline users. That is to say, even if the receiving party is in offline status, the anonymous communication system can also match and select one information transmission unit to be delivered to the receiving party in offline status. Here, "deliver" refers to store the information transmission unit into a storage space corresponding to the receiving party and deliver the information transmission unit to a terminal of the receiving party when the receiving party is online through the terminal.

The present disclosure can also support that a user online active receives delivery, i.e., the user online initiates a receiving instruction. The information delivery module of the anonymous communication system is configured to accept the receiving instruction initiated by the receiving party, send information of the receiving party who initiates the receiving instruction to the delivery selection module for processing, and deliver the ultimately selected information transmission unit obtained from the delivery selection module to the receiving party who initiates the receiving instruction.

Of course, if the receiving instruction sent by the user includes a request condition (for example, type of an information transmission unit to be matched, age, sex, etc. of a sender of the information transmission unit, can be directly specified in the request condition) which is a matching condition actively delivered by the user, the information delivery module further sends the request condition in the receiving instruction to the delivery selection module; the delivery selection module adds the request condition in the receiving instruction to the index matching information of the receiving party; the index matching information adding with the request condition is used to inquire the corresponding information transmission unit set.

A transmission method of the information transmission unit of the above anonymous communication system is described in the following. The method mainly includes:

sending process: after receiving an information transmission unit sent by a sending party, storing the information transmission unit in a storage pool, inserting the information transmission unit into a preset ordering queue, and generating more than one piece of index information (i.e., multiple index information) according to content of the information transmission unit and information of the sending party;

receiving process: setting more than one index matching information of a receiving party; inquiring index information of the storage pool according to the index matching information of the receiving party, finding out an information transmission unit set which meets the index matching information, selecting one information transmission unit from the set according to an ordering situation of each information transmission unit in the set in the ordering queue and a preset delivery strategy, delivering the selected information transmission unit to the receiving party, and then adjusting the ordering queue according to a delivery situation.

Figure 2:
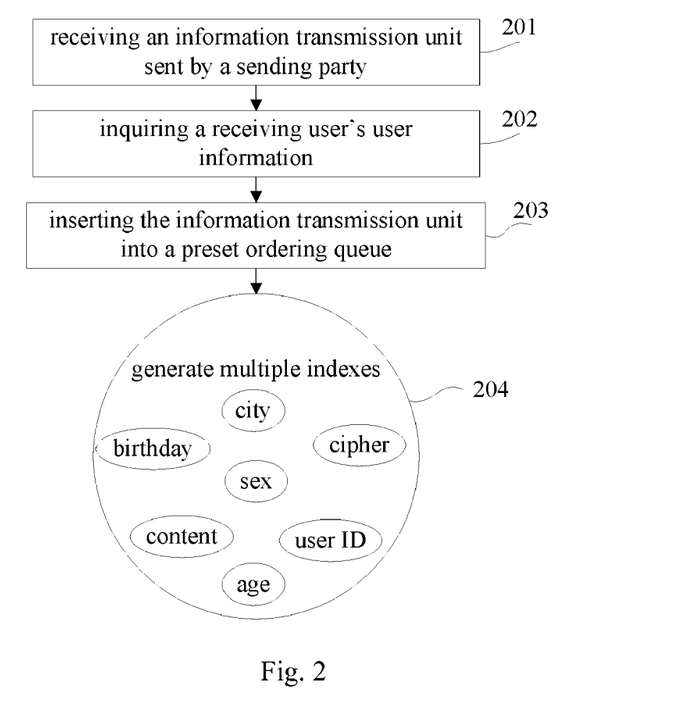
FIG. 2 is a schematic diagram showing a sending process of an information transmission unit in the anonymous communication system shown in FIG. 1.

FIG. 2 is a schematic diagram showing a sending process of the information transmission unit. Referring to FIG. 2, the sending process specifically includes:

Step 201: receiving an information transmission unit sent by a sending party.

Step 202: inquiring a receiving user's user information. The user information includes: user's basic attribute information, such as user ID, age, sex, city, birthday, etc. as well as historical record (such as user's log-in mode and specific content having been issued, for example, "cipher" in the anonymous communication system) of the user for sending and receiving information transmission units.

Step 203: inserting the information transmission unit into a preset ordering queue.

The ordering queue can include:

a delivery number queue: in the delivery number queue, information transmission units are ordered according to delivery number of the information transmission units; after delivering one information transmission unit every time, the delivery number queue is re-adjusted according to delivery number;

a recent delivery time queue: in the recent delivery time queue, information transmission units are ordered according to recent delivery times of the information transmission units; after delivering one information transmission unit every time, the recent delivery time queue is re-adjusted according to recent delivery times;

a generation time queue: in the generation time queue, information transmission units are ordered according to generation times of the information transmission units.

Step 204: generating more than one piece of index information, i.e., multiple index information, based on user formation and content of the delivered information transmission unit, adding the index information into each HASH index in a storage pool. One information transmission unit can be stored in multiple indexes. In the specific implementation, the index information can be compressed into data units of equal length and then be added into each HASH index, this can speed up inquiring and matching speed.

Figure 3:
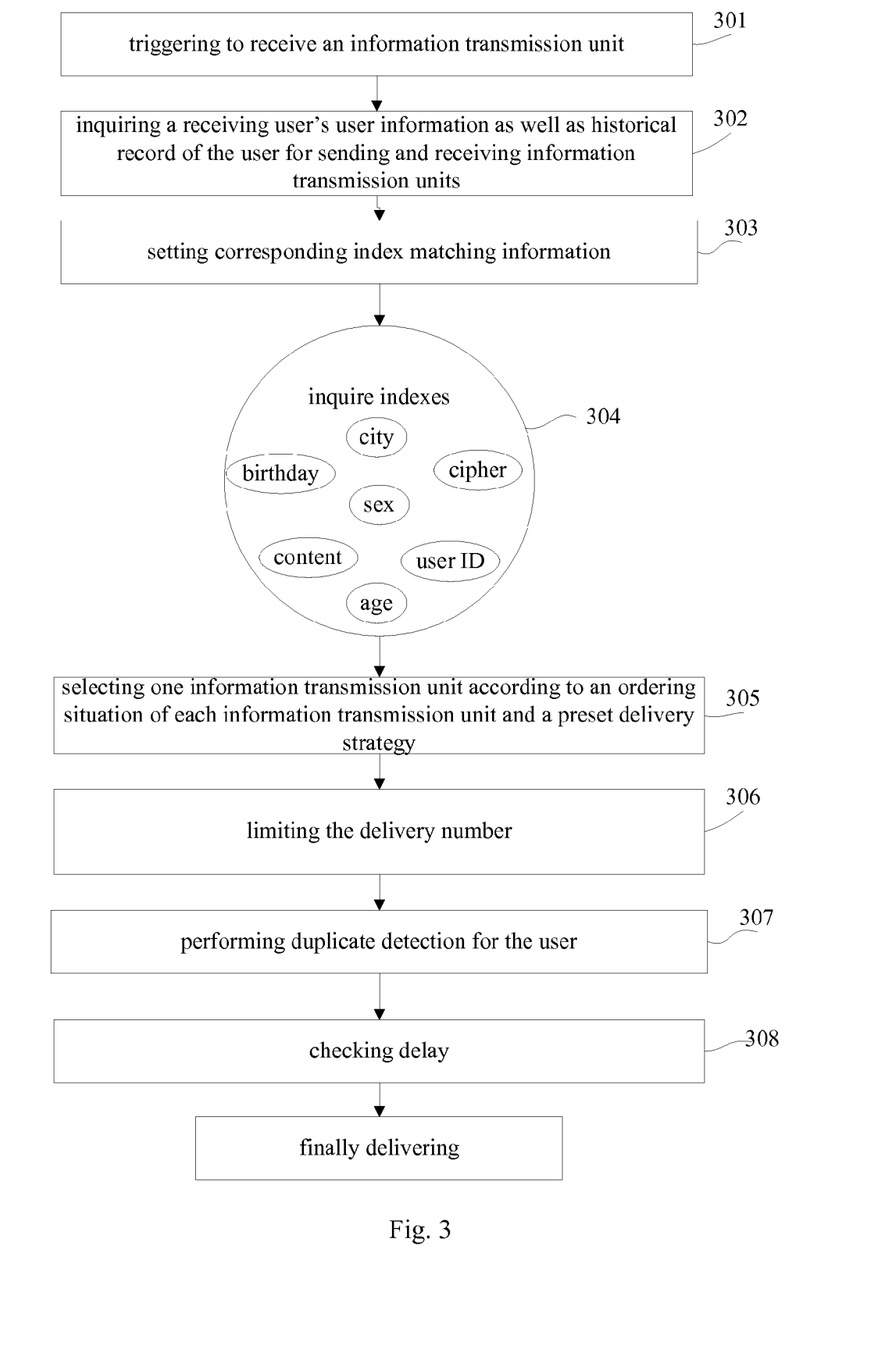
FIG. 3 is a schematic diagram showing a receiving process of the information transmission unit in the anonymous communication system shown in FIG. 1.

FIG. 3 is a schematic diagram showing a receiving process of the information transmission unit. Referring to FIG. 3, the receiving process includes:

Step 301: triggering to receive an information transmission unit. Here, there are two cases: the first one is offline receiving, i.e., on condition that users are not online, the anonymous communication system triggers an operation of receiving information transmission unit for each user successively, and delivers one ultimately selected information transmission unit to a user's login terminal after the user is online; the second one is online receiving, i.e., a user online sends a receiving instruction, the anonymous communication triggers an operation of receiving information transmission unit after receiving the receiving instruction and delivers one ultimately selected information transmission unit to the user who sends the receiving instruction (i.e., receiving party).

Step 302: inquiring a receiving user's user information. The user information includes: user's basic attribute information, such as user ID, age, sex, city, birthday, etc. as well as historical record (such as user's log-in mode and specific content having been issued, for example, "cipher" in the anonymous communication system) of the user for sending and receiving information transmission units. The "cipher" refers to a segment of special characters contained in the information transmission unit. In the present disclosure, one user who can send an information transmission unit carrying a cipher, can receive an information transmission unit carrying the same cipher from other user.

Step 303: setting corresponding index matching information. In the step 303, one corresponding index matching information can be set according to the user's attribute information, and another corresponding index matching information can be set according to historical record of the user for sending and receiving information transmission units, thereby obtaining more than one index matching information. Here, in order to improve response rate of information transmission units, an optimal attribute matching probability can be obtained mainly through the experimental analysis, and the index matching information of the ser can be set based on the probability. For example, the index matching information can be set as: "city=Guangzhou and sex=female and age=mood for love" and "cipher=hello" and "content=truth bottle" etc.

The two steps 302 and 303 can be executed when the receiving party is in offline status. If the receiving party online sends the receiving instruction in the step 301, the processing results of these two steps can be directly used and performing the step 304.

Step 304: inquiring index information of the storage pool according to the index matching information of the receiving party, and finding out an information transmission unit set which meets the index matching information.

If the receiving party online sends the receiving instruction and the receiving instruction sent by the receiving party includes the request condition in the step 301, then in the step 304, the request condition in the receiving instruction is added to the index matching information of the receiving party (i.e., added to the index matching information set in the step 303), the index matching information adding with the request condition is used to inquire the corresponding information transmission unit set.

If the receiving party online sends the receiving instruction and the receiving party is a mobile terminal user in the step 301, then, in the step 304, the user's location-based services (LBS) information is further obtained and the LBS information is added to the index matching information of the receiving party (i.e., added to the index matching information set in the step 303), the index matching information adding with the LBS information is used to inquire the corresponding information transmission unit set. The LBS information can be information of a city or region where the receiving party is. Matching with the LBS information can make the receiving party obtain information transmission units of sending parties who are in the same city or region as the receiving party, thereby satisfying individual needs.

In the present disclosure, multiple indexes are established for attributes of each user; multiple condition matching of the step 304 can automatically select the optimal search order to achieve fast matching.

Step 305: selecting one information transmission unit according to an ordering situation of each information transmission unit and a preset delivery strategy. That is, according to an ordering situation of each information transmission unit in the above selected set in the ordering queue and a preset delivery strategy, selecting one information transmission unit from the set, delivering the selected information transmission unit to the receiving party, and then adjusting the ordering queue according to a delivery situation. In the examples shown in FIGS. 2-3, a delivery number queue, a recent delivery time queue and a generation time queue are set, thus, the specific delivery strategy of this example can be a variety of delivery strategies, and may include following manners:

according to an ordering situation of the delivery number queue, selecting one information transmission unit with the minimum delivery number from the set and delivering the selected information transmission unit to the receiving party;

on condition that more than one information transmission units have a same delivery number, according to an ordering situation of the recent delivery time queue, selecting one information transmission unit whose recent delivery time is the earliest from the information transmission units having the same delivery number and delivering the selected information transmission unit to the receiving party;

on condition that more than one information transmission units have a delivery number of 0, according to an ordering situation of the generation time queue, selecting one information transmission unit whose generation time is the earliest from the information transmission units having a delivery number of 0 and delivering the selected information transmission unit to the receiving party.

Of course, the delivery strategy is not limited to the above items, and can also be set and processed according to an administrator's needs.

In the present disclosure, since multiple indexes are established based on user information and content of the information transmission unit, and multiple ordering queues are used for matching, thus, fast searching and matching can be achieved and one hundred million level matching every day can be supported.

In order to further optimize the degree of association between the receiving party and the content of the information transmission unit as well as the sending party, and improve response rate and activity, in the example shown in FIG. 3, before ultimately delivering the selected information transmission unit to the receiving party, a step 306 of limiting delivery number and a step 307 of performing duplicate detection for the user. The details are as follows:

Step 306: limiting the delivery number, i.e., determining whether a delivery number of the information transmission unit selected in the above step 305 exceeds a preset value. If the delivery number of the information transmission unit selected in the above step 305 does not exceed the preset value, delivering the information transmission unit or proceeding to the step 307; otherwise, removing the information transmission unit from the set selected in the step 304, and re-performing the step 305 to re-select an information transmission unit from the updated set according to the ordering situation and the delivery strategy, and re-performing the step 306.

Step 307: performing duplicate detection for the user, i.e., determining whether the receiving party receives an information transmission unit sent by the sending party of the information transmission unit selected in the step 305 or 306 within a preset period of time; if not received, performing the delivery; otherwise, removing the information transmission unit from the set selected in the step 304, and re-performing the step 305 to re-select an information transmission unit from the updated set according to the ordering situation and the delivery strategy, and re-performing the step 307 or the steps 306 and 307.

Further, the present disclosure can further set a delay queue. After delivering the information transmission unit, the present disclosure can further include: moving the information transmission unit into the delay queue and starting timing, and moving the information transmission unit out of the delay queue when exceeding a preset delay time.

In the process of responding to the receiving instruction, after selecting one information transmission unit from the set according to the ordering situation and the delivery strategy and before delivering the information transmission unit, the process further includes:

Step 308: checking delay, i.e., determining whether the information transmission unit is in the delay queue. If the information transmission unit is not in the delay queue, then delivering the information transmission unit; otherwise, deleting the information transmission unit from the set selected in the step 304, and re-performing the step 305 to re-select an information transmission unit from the updated set according to the ordering situation and the delivery strategy, and re-performing the step 308 or the steps 306, 307, 308, or the steps 307 and 308.

The above steps 306, 307, 308 are optional steps, the selected information transmission unit can be directly delivered after execution of the step 305, and any one of the steps 306, 307, 308 can also be selected to further filter the information transmission unit.

The foregoing are only preferred embodiments of the present disclosure, and are not used to limit the present disclosure. Any modification, equivalent replacement, or improvement made without departing from the spirit and principle of the present disclosure should fall within the scope of the present disclosure. So the protection scope of the present disclosure should be defined by the protection scope of the claims.

INDUSTRIAL APPLICABILITY

In the present disclosure, by using multiple index matching and multiple delivery strategies to find out one information transmission unit which meets requirements of the user and other matching conditions randomly generated by the system, the degree of association between the receiving party and the content of the information transmission unit as well as the sending party in the anonymous communication system can be greatly improved, and the user response rate and activity can be improved, some complex matching requirements of the user can be met, and the user response rate and activity can be improved.

What is claimed is:

1. A transmission method of information transmission unit in anonymous communication system, the method comprising:

after receiving an information transmission unit sent by a sending party, storing the information transmission unit in a storage pool, inserting the information transmission unit into a preset ordering queue, and generating more than one piece of index information according to content of the information transmission unit and information of the sending party;

setting more than one index matching information of a receiving party; inquiring index information of the storage pool according to the index matching information of the receiving party, finding out an information transmission unit set which meets the index matching information, selecting one information transmission unit from the set according to an ordering situation of each information transmission unit in the set in the ordering queue and a preset delivery strategy, delivering the selected information transmission unit to the receiving party, and then adjusting the ordering queue according to a delivery situation;

wherein the setting more than one index matching information of a receiving party specifically includes:

setting one corresponding index matching information according to the user's attribute information;

setting another corresponding index matching information according to historical record of the user for sending and receiving information transmission units;

wherein the ordering queue comprises a delivery number queue; in the delivery number queue, information transmission units are ordered according to delivery number of the information transmission units; after delivering one information transmission unit every time, the delivery number queue is re-adjusted according to delivery number;

the delivery strategy specifically includes: according to an ordering situation of the delivery number queue, selecting one information transmission unit with a minimum delivery number from the set and delivering the selected information transmission unit to the receiving party.

2. The method of claim 1, wherein the method further comprises:

receiving a receiving instruction including a request condition sent by the receiving party;

after receiving the receiving instruction sent by the receiving party, adding the request condition in the receiving instruction into the index matching information of the receiving party, and using the index matching information adding with the request condition to inquire the corresponding information transmission unit set.

3. A transmission method of information transmission unit in anonymous communication system, the method comprising:

after receiving an information transmission unit sent by a sending party, storing the information transmission unit in a storage pool, inserting the information transmission unit into a preset ordering queue, and generating more than one piece of index information according to content of the information transmission unit and information of the sending party;

setting more than one index matching information of a receiving party; inquiring index information of the storage pool according to the index matching information of the receiving party, finding out an information transmission unit set which meets the index matching information, selecting one information transmission unit from the set according to an ordering situation of each information transmission unit in the set in the ordering queue and a preset delivery strategy, delivering the selected information transmission unit to the receiving party, and then adjusting the ordering queue according to a delivery situation; wherein the method further comprises:

after receiving a receiving instruction sent by a mobile terminal user; further obtaining the user's location-based services (LBS) information, adding the LBS information into the index matching information of the receiving party, and using the index matching information adding with the LBS information to inquire the corresponding information transmission unit set;

wherein the ordering queue comprises a delivery number queue; in the delivery number queue, information transmission units are ordered according to delivery number of the information transmission units; after delivering one information transmission unit every time, the delivery number queue is re-adjusted according to delivery number;

the delivery strategy specifically includes: according to an ordering situation of the delivery number queue, selecting one information transmission unit with a minimum delivery number from the set and delivering the selected information transmission unit to the receiving party.

4. A transmission method of information transmission unit in anonymous communication system, the method comprising:

after receiving an information transmission unit sent by a sending party, storing the information transmission unit in a storage pool, inserting the information transmission unit into a preset ordering queue, and generating more than one piece of index information according to content of the information transmission unit and information of the sending party;

setting more than one index matching information of a receiving party; inquiring index information of the storage pool according to the index matching information of the receiving party, finding out an information transmission unit set which meets the index matching information, selecting one information transmission unit from the set according to an ordering situation of each information transmission unit in the set in the ordering queue and a preset delivery strategy, delivering the selected information transmission unit to the receiving party, and then adjusting the ordering queue according to a delivery situation, wherein the ordering queue comprises a delivery number queue; in the delivery number queue, information transmission units are ordered according to delivery number of the information transmission units; after delivering one information transmission unit every time, the delivery number queue is re-adjusted according to delivery number;

the delivery strategy specifically includes: according to an ordering situation of the delivery number queue, selecting one information transmission unit with a minimum delivery number from the set and delivering the selected information transmission unit to the receiving party.

5. The method of claim 4, wherein after selecting one information transmission unit from the set according to the ordering situation and the delivery strategy and before delivering the selected information transmission unit, the method further comprises:

determining whether a delivery number of the information transmission unit exceeds a preset value; if not exceeded, delivering the information transmission unit; otherwise, removing the information transmission unit from the set, re-selecting an information transmission unit from the set being updated according to the ordering situation and the delivery strategy, and re-performing this step.

6. The method of claim 4, wherein after selecting one information transmission unit from the set according to the ordering situation and the delivery strategy and before delivering the selected information transmission unit, the method further comprises:

determining whether the receiving party receives an information transmission unit sent by the sending party of the information transmission unit within a preset period of time; if not received, performing the delivery; otherwise, removing the information transmission unit from the set, re-selecting an information transmission unit from the set being updated according to the ordering situation and the delivery strategy.

7. The method of claim 4, wherein the method further setting a delay queue; after delivering the information transmission unit, the method further comprises:

moving the information transmission unit into the delay queue and starting timing, and moving the information transmission unit out of the delay queue when exceeding a preset delay time;

in a process of responding to the receiving instruction, after selecting one information transmission unit from the set according to the ordering situation and the delivery strategy and before delivering the information transmission unit, the process further includes:

determining whether the information transmission unit is in the delay queue; if the information transmission unit is not in the delay queue, then delivering the information transmission unit; otherwise, removing the information transmission unit from the set, and re-selecting an information transmission unit from the set being updated according to the ordering situation and the delivery strategy.

8. The method of claim 4, wherein the ordering queue comprises a recent delivery time queue; in the recent delivery time queue, information transmission units are ordered according to recent delivery times of the information transmission units; after delivering one information transmission unit every time, the recent delivery time queue is re-adjusted according to recent delivery times;

the delivery strategy further includes: on condition that more than one information transmission units have a same delivery number, according to an ordering situation of the recent delivery time queue, selecting one information transmission unit whose recent delivery time is the earliest from the information transmission units having the same delivery number and delivering the selected information transmission unit to the receiving party.

9. The method of claim 8, wherein after selecting one information transmission unit from the set according to the ordering situation and the delivery strategy and before delivering the information transmission unit, the method further comprises:

determining whether a delivery number of the information transmission unit exceeds a preset value; if not exceeded, delivering the information transmission unit; otherwise, removing the information transmission unit from the set, re-selecting an information transmission unit from the set being updated according to the ordering situation and the delivery strategy, and re-performing this step.

10. The method of claim 8, wherein after selecting one information transmission unit from the set according to the ordering situation and the delivery strategy and before delivering the information transmission unit, the method further comprises:

determining whether the receiving party receives an information transmission unit sent by the sending party of the information transmission unit within a preset period of time; if not received, performing the delivery; otherwise, removing the information transmission unit from the set, and re-selecting an information transmission unit from the set being updated according to the ordering situation and the delivery strategy.

11. The method of claim 8, wherein the method further setting a delay queue; after delivering the information transmission unit, the method further comprises: moving the information transmission unit into the delay queue and starting timing, and moving the information transmission unit out of the delay queue when exceeding a preset delay time;

in a process of responding to the receiving instruction, after selecting one information transmission unit from the set according to the ordering situation and the delivery strategy and before delivering the information transmission unit, the process further includes:

determining whether the information transmission unit is in the delay queue; if the information transmission unit is not in the delay queue, then delivering the information transmission unit; otherwise, removing the information transmission unit from the set, and re-selecting an information transmission unit from the set being updated according to the ordering situation and the delivery strategy.

12. The method of claim 8, wherein the ordering queue comprises a generation time queue; in the generation time queue, information transmission units are ordered according to generation times of the information transmission units;

the delivery strategy further includes: on condition that more than one information transmission units have a delivery number of 0, according to an ordering situation of the generation time queue, selecting one information transmission unit whose generation time is the earliest from the information transmission units having a delivery number of 0 and delivering the selected information transmission unit to the receiving party.

13. The method of claim 12, wherein after selecting one information transmission unit from the set according to the ordering situation and the delivery strategy and before delivering the information transmission unit, the method further comprises:

determining whether a delivery number of the information transmission unit exceeds a preset value; if not exceeded, delivering the information transmission unit; otherwise, removing the information transmission unit from the set, re-selecting an information transmission unit from the set being updated according to the ordering situation and the delivery strategy, and re-performing this step.

14. The method of claim 12, wherein after selecting one information transmission unit from the set according to the ordering situation and the delivery strategy and before delivering the information transmission unit, the method further comprises:

determining whether the receiving party receives an information transmission unit sent by the sending party of the information transmission unit within a preset period of time; if not received, performing the delivery; otherwise, removing the information transmission unit from the set, and re-selecting an information transmission unit from the set being updated according to the ordering situation and the delivery strategy.

15. The method of claim 12, wherein the method further setting a delay queue; after delivering the information transmission unit, the method further comprises: moving the information transmission unit into the delay queue and starting timing, and moving the information transmission unit out of the delay queue when exceeding a preset delay time;

in a process of responding to the receiving instruction, after selecting one information transmission unit from the set according to the ordering situation and the delivery strategy and before delivering the information transmission unit, the process further includes:

determining whether the information transmission unit is in the delay queue; if the information transmission unit is not in the delay queue, then delivering the information transmission unit; otherwise, removing the information transmission unit from the set, and re-selecting an information transmission unit from the set being updated according to the ordering situation and the delivery strategy.

* * * * *

UNITED STATES PATENT AND TRADEMARK OFFICE
CERTIFICATE OF CORRECTION

| | | |
|---|---|---|
| PATENT NO. | : 9,112,967 B2 | Page 1 of 1 |
| APPLICATION NO. | : 14/352020 | |
| DATED | : August 18, 2015 | |
| INVENTOR(S) | : Meng Zhu | |

It is certified that error appears in the above-identified patent and that said Letters Patent is hereby corrected as shown below:

Title Page, item (30) Foreign Application Priority Data

Please replace with the following:

Nov. 17, 2011 (CN) ............................... 2011103649208

Signed and Sealed this
Nineteenth Day of January, 2016

Michelle K. Lee
*Director of the United States Patent and Trademark Office*